Figure 4:
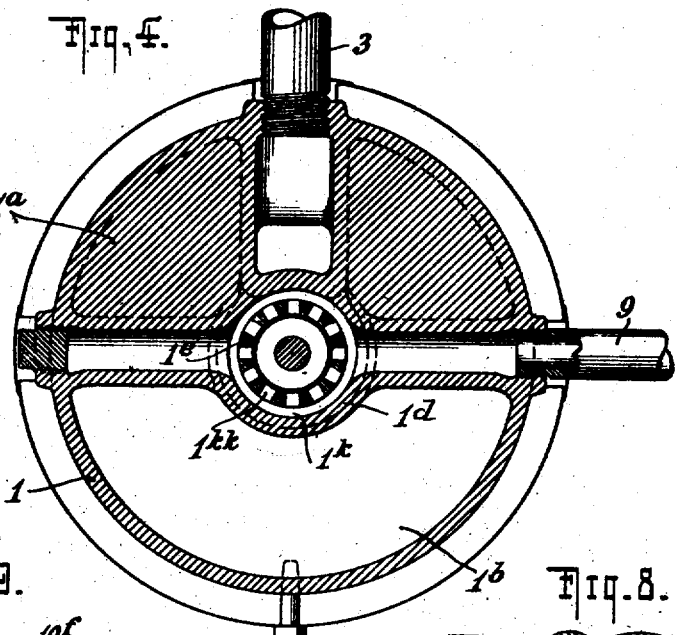

H. S. VINCENT & J. L. MOHUN.
LOCOMOTIVE DRIFTING VALVE MECHANISM.
APPLICATION FILED JAN. 4, 1919.
Reissued Feb. 25, 1919.
14,600.
3 SHEETS—SHEET 1.
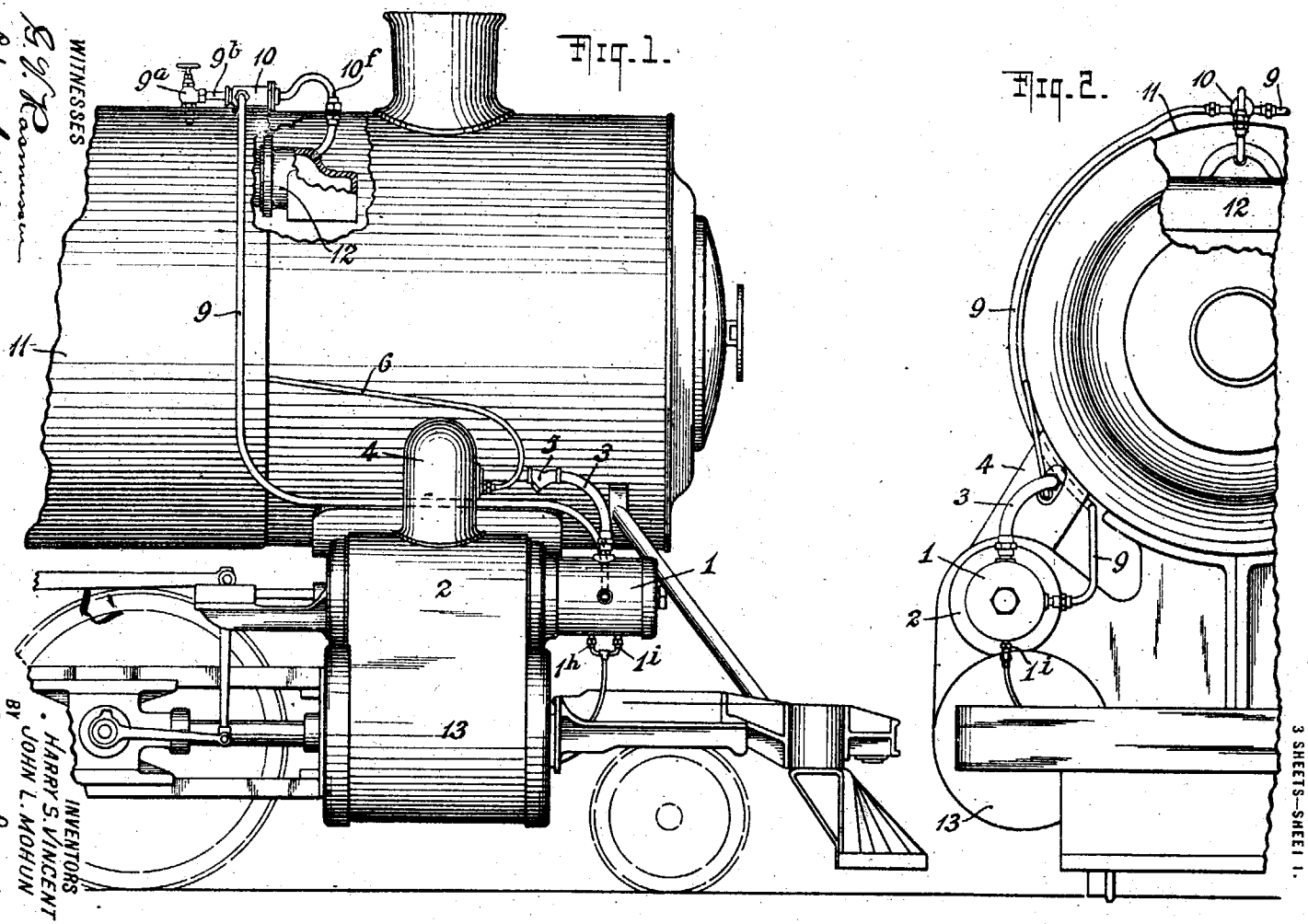
WITNESSES
G. V. Rasmussen
Edwin Shirley Young
INVENTORS
HARRY S. VINCENT
JOHN L. MOHUN
BY
Breese & Schenck
ATTORNEYS
THE HARRIS-PETERS CO., PHOTO-LITHO., WASHINGTON, D. C.

H. S. VINCENT & J. L. MOHUN.
LOCOMOTIVE DRIFTING VALVE MECHANISM.
APPLICATION FILED JAN. 4, 1919.
Reissued Feb. 25, 1919.
14,600.
3 SHEETS—SHEET 2.
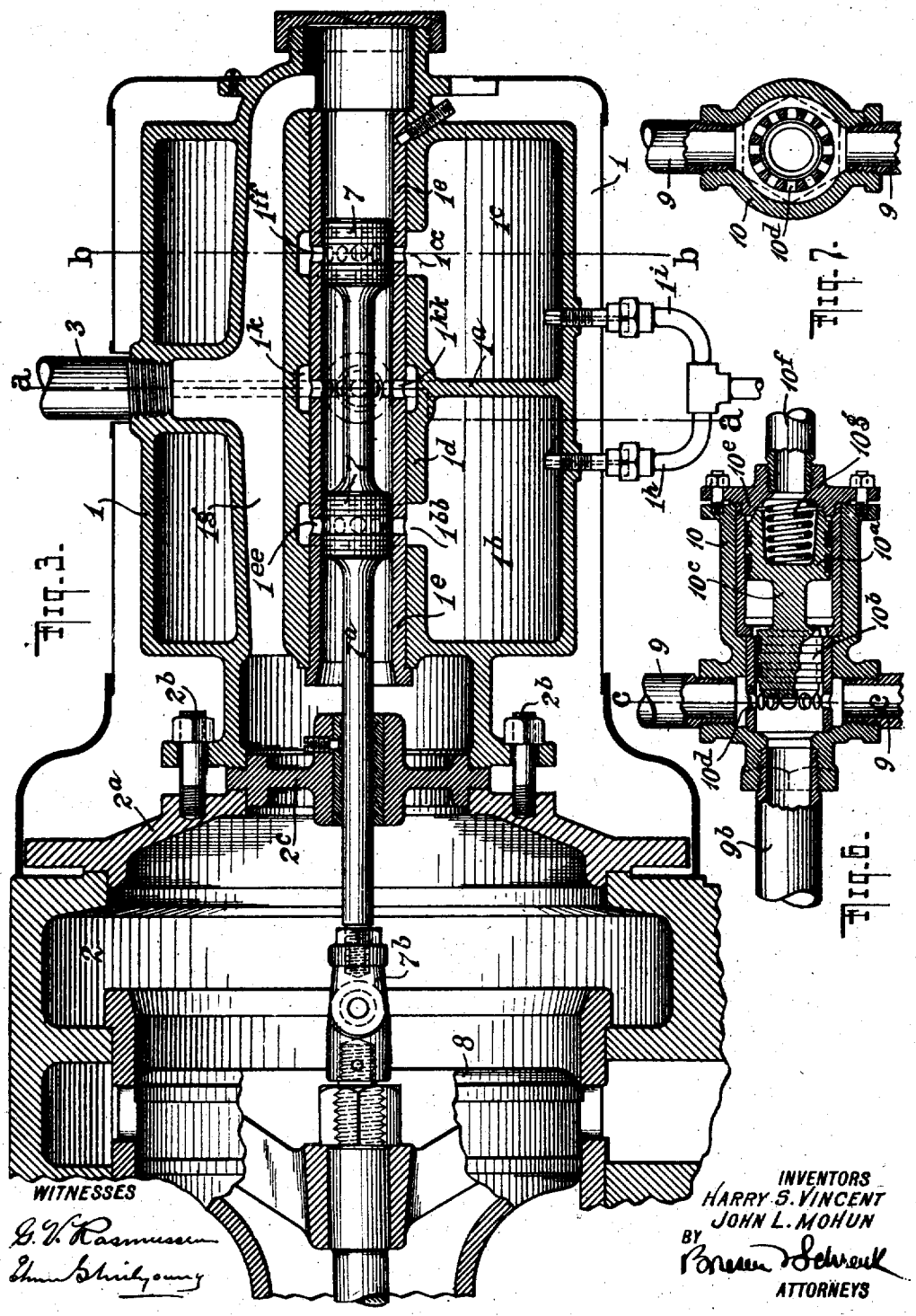
WITNESSES
G. V. Rasmussen
Thos. Shirley Young
INVENTORS
HARRY S. VINCENT
JOHN L. MOHUN
BY Brown & Schroeder
ATTORNEYS
THE NORRIS PETERS CO., PHOTO-LITHO., WASHINGTON, D. C.

H. S. VINCENT & J. L. MOHUN.

LOCOMOTIVE DRIFTING VALVE MECHANISM.

APPLICATION FILED JAN. 4, 1919.

Reissued Feb. 25, 1919.

14,600.

3 SHEETS—SHEET 3.

WITNESSES

G. V. Rasmussen

Thomas Steinhoung

INVENTORS

HARRY S. VINCENT

JOHN L. MOHUN

BY Bonesen & Schereck

ATTORNEYS

UNITED STATES PATENT OFFICE.

HARRY S. VINCENT, OF RIDGEWOOD, NEW JERSEY, AND JOHN L. MOHUN, OF BROOKLYN, NEW YORK, ASSIGNORS TO LOCOMOTIVE SUPERHEATER COMPANY, OF NEW YORK, N. Y., A CORPORATION OF DELAWARE.

LOCOMOTIVE-DRIFTING-VALVE MECHANISM.

14,600. Specification of Reissued Letters Patent. Reissued Feb. 25, 1919.

Original No. 1,211,645, dated January 9, 1917, Serial No. 115,781, filed August 19, 1916. Application for reissue filed January 4, 1919. Serial No. 269,696.

*To all whom it may concern:*

Be it known that we, HARRY S. VINCENT, of Ridgewood, in the county of Bergen and State of New Jersey, and JOHN L. MOHUN, of Brooklyn, in the county of Kings and State of New York, have jointly invented a certain new and useful Improvement in Locomotive-Drifting-Valve Mechanisms, of which improvement the following is a specification.

Our invention relates to valve mechanism for automatically effecting the admission of a limited quantity of steam, directly from the boiler to the valve chests, and cylinders of a locomotive engine, during the periods in which the locomotive is "drifting" or running with its throttle valve closed, in order to prevent the formation of a vacuum in the cylinders, to afford proper lubrication to the cylinders, and to prevent the carbonization of oil therein.

The object of our invention is to provide a mechanism of the type above referred to, which shall be readily and inexpensively applicable in the various locomotive designs of present approved practice, and which will embody the following structural and operative features and advantages, viz: (*a*) means for automatically and positively opening a valve which controls the supply of saturated steam to the valve chests and cylinders, coincidently with the closure of the throttle and the commencement of the "drifting" of the locomotive, and for automatically and positively closing said valve when the locomotive is brought to a stop. (*b*) Means for providing a supply of saturated steam, proportionately to the speed of the pistons, and for preventing the accumulation, in the valve chests, of sufficient pressure to operate the superheater damper. (*c*) Means for admitting saturated steam only to the cylinders, when drifting, and preventing the admission, in such period, of steam which has passed through the superheater. (*d*) Means for preventing, under normal working conditions, the admission of saturated steam by the drifting valve, and thereby preventing the injection of moist steam and the absorption of a substantial portion of the superheat. (*e*) Means for insuring the positive action of the drifting valve and preventing the liability of sticking of valves which is from time to time experienced with those operated by differential pistons actuated by variations of pressure. (*f*) Means for insuring the operation of the mechanism in any and all positions of the reverse lever, and thereby rendering it independent of the different adjustments of the reverse lever which are made by different enginemen, when drifting. (*g*) Means for effecting the flow of saturated steam into the valve chests, when drifting, in the same direction as when running with open throttle, in order that the distribution of the lubricant may be the usual one.

The improvement claimed is hereinafter fully set forth.

Figure 9:
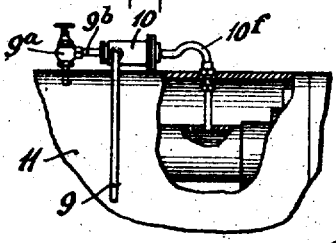
Figure 8:
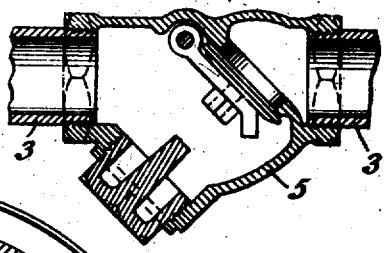
Figure 5:
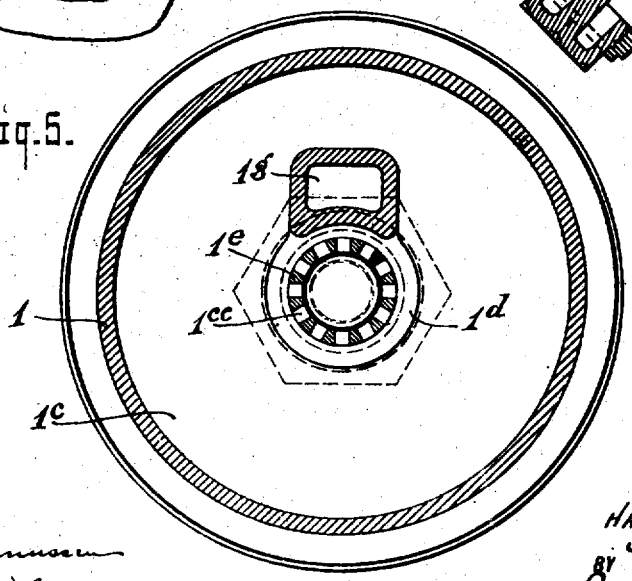

In the accompanying drawings: Figure 1 is a side view, in elevation, of the forward portion of a locomotive engine, illustrating an application of our invention; Fig. 2, a front view of the same; Fig. 3, an axial section, on a larger scale, through a drifting valve casing and the adjoining portion of a valve chest; Figs. 4 and 5, transverse sections through the drifting valve casing, on the lines *a a* and *b b*, respectively, of Fig. 3; Fig. 6, an axial section through the shut off valve casing; Fig. 7 a transverse section through the same, on the line *c c* of Fig. 6; Fig. 8, a longitudinal section, on an enlarged scale, through the non-return valve; and, Fig. 9, a section through the boiler and smoke box, showing the shut off valve casing connected to the main steam supply line, in rear of the superheater header.

The leading and characteristic feature of novelty of our invention consists in a valve which controls the supply of a limited quantity of saturated steam to a distribution valve chest and cylinder of a locomotive, when running with its throttle closed, and which is alternately opened and closed by positive connection with a moving member of the locomotive, and means, interposed between said valve and cylinder, for alternately effecting the admission of steam to and its exclusion from the cylinder.

In the practice of our invention, referring descriptively to the specific embodiment thereof which has been selected for exemplification herein, two drifting valve chests, 1, are provided, one for each of the distribution valve chests, 2, of the locomotive, which communicate by ports (not shown), with the cylinders, 13, in the usual manner. Said drifting valve chests, and their contained valve mechanism and connections, being similar in all particulars of structure and operation, the description of the drifting valve mechanism comprised in our invention which is located on one side of the locomotive, will be understood as being equally applicable to that on the other side.

The drifting valve casing, 1, which is of cylindrical form, is closed at its outer end, by an integral head, having a central opening, fitted with a removable cap, $1^m$ and its inner end is secured to the front head, $2^a$, of the distribution valve chest, 2, in line axially with the distribution valve, 8, by bolts, $2^b$, a partition, $2^c$, being interposed to separate it from the distribution valve chest. The drifting valve chest is divided by a middle transverse partition, $1^a$, into two chambers, $1^b$ and $1^c$, through which there extends, centrally and longitudinally, a cylindrical open-ended valve chamber, $1^d$, which communicates with the casing chambers, $1^b$ and $1^c$, by passages, $1^{bb}$ and $1^{cc}$, respectively, and with a lateral drifting supply pipe, 9, by a passage, $1^k$. An open ended bushing, $1^e$, is fitted in the valve chamber, $1^d$, said bushing communicating, at the middle of its length, with the drifting supply pipe passage, $1^k$, of the valve chamber, by ports, $1^{kk}$, and, at points within the casing chambers, $1^b$ and $1^c$, communicating with said chambers, by circumferential ports, $1^{ee}$ and $1^{ff}$, respectively. The bushing communicates, at its ends, with a longitudinal delivery steam passage, $1^g$, which is extended centrally to the wall of the casing, 1, at which there is connected to it a drifting delivery steam pipe, 3, leading into the distribution valve chest, 2, through a connection with the outside steam pipe, 4, which supplies said valve chest. The drifting delivery steam pipe, 3, is fitted with a non-return valve 5, of the ordinary construction, which permits flow of steam from the drifting valve casing to the distribution valve chest, but prevents flow in the opposite direction, and the delivery steam pipe opens into the steam pipe, 4, adjacent to, and in the same direction as, the usual lubricator pipe, 6. Drain pipes, $1^h$ and $1^i$, are fitted in the lower portions of the chambers, $1^b$ and $1^c$, of the casing, for leading off water of condensation to a suitable point of discharge.

A drifting valve, which comprises two properly packed pistons, 7, 7, is formed on or secured to a stem, $7^a$, and is fitted to be reciprocated in the bushings, $1^e$ and $1^f$, so as to control the ports, $1^{ee}$ and $1^{ff}$, thereof, by the stem, $8^a$, of the distribution valve, 8, to which stem the drifting valve stem, $7^a$, which passes through the partition, $2^c$, is connected by a yoke or clevis, $7^b$. Saturated steam from the boiler is supplied to the interior of the valve chamber bushing, $1^e$, of the drifting valve casing of each of the distribution valve chests, during the periods in which the locomotive is drifting or running with throttle closed, through drifting supply pipes, 9, leading to the casing, 10, of an automatic shut off valve, to be presently described, from which casing a pipe, $9^b$, controlled by a manually operable angle valve, $9^a$, which is open continuously during the operation of the locomotive, leads to the steam space of the locomotive boiler, 11.

The admission of saturated steam to the drifting valve casings, during the drifting of the locomotive, and the exclusion of steam therefrom whenever, and as long as, the locomotive is running under normal conditions, *i. e.*, with open throttle, are automatically and positively effected by a shut off valve, (see Figs. 6 and 7), which is inclosed in a casing, 10, supported on the boiler, adjacent to its forward end, and comprises a larger and a smaller piston, $10^a$ and $10^b$, respectively, connected by an intermediate stem or body, $10^c$, and fitted to reciprocate in bushings which line the casing, 10. The outer end of the smaller piston, $10^b$, is of conical form and is adapted to act as a valve by seating at the end of the pipe, $9^b$, and closing communication between said pipe and ports, $10^d$, in the bushing of the piston, which ports establish communication between the interior of the piston bushing and the drifting supply pipes, 9, leading from the casing, 10, to the drifting valve casings, 1. The end of the casing, 10, adjacent to which the larger piston, $10^a$, is located, is closed by a removable head, $10^e$, to which is connected a pipe, $10^f$, the opposite end of which communicates with the T head or superheater header, 12, or may be connected to the ordinary throttle governed main steam supply line, with which the T or header communicates in the usual manner, at any other preferred point between the throttle valve and the distribution valve chests, an instance of which change of location of the communicating pipe being shown in Fig. 9. The outer end of the larger piston, $10^a$, is of conical form and adapted to act as a valve, by seating on the head, $10^e$. A spring, $10^g$, interposed between the larger piston and the head of the casing, serves to prevent the slamming of the piston when moved to the right, and the dash pot action induced by the reduced space on its left hand side prevents slamming when moved to the left.

Upon the opening of the throttle valve, and the resultant increase of pressure in the T head or superheater header, and consequently on the outer side of the larger piston, $10^a$, of the shut off valve, the preponderance of pressure on said piston above that on the smaller piston, $10^b$, forces the pistons to the left, and the smaller piston seats at the opening of the pipe, $9^b$, and shuts off the supply of saturated steam from said pipe to the drifting valve casings. When the throttle valve is closed, and pressure therefore is reduced in the T head or superheater header, and on the right hand side of the larger piston, the pressure on the smaller piston moves the shut off valve to the right, and saturated steam from the boiler is admitted through the pipe, $9^b$, and ports, $10^d$, to the drifting supply pipes, 9, and thence to drifting valve casings and distribution valve chests. The seating of the larger piston on the head of the casing prevents the flow, into the superheater, of any steam that may leak past the packing rings of the pistons.

In the operation of a locomotive on which the invention is applied, the saturated steam which is supplied through the pipes, 9, to the drifting valve casings, when the locomotive is drifting, enters the space between the pistons of the drifting valves, and by the reciprocation thereof, effected by their connection to the steam distribution valves, is admitted, alternately, to the opposite end chambers, $1^b$ and $1^c$, and the casings, and thence passes from the outer sides of the drifting valve pistons, through the passages, $1^g$, and pipes, 3, to the distribution valve chests. The purpose of the chambers, $1^b$ and $1^c$, is to measure out a definite quantity of steam for delivery to the engine cylinders, at each stroke of the piston, the valve, 7, operating so that only one chamber is in communication with the cylinder at any given time, and, when in such communication, not communicating with the steam supply. The admission of saturated steam thus effected, continues throughout the period in which the locomotive is drifting, and as soon as the throttle is re-opened for normal operation, it is terminated by the closure of the drifting supply pipes by the automatic operation of the shut off valve. When the locomotive is standing, no saturated steam will be admitted to the distribution valve chests, by reason of the drifting valves being stationary and therefore preventing the passage of steam through their casings.

Among the advantages, in practice, of a construction substantially as herein set forth, there may be noted that the admission of saturated steam, in drifting, is proportionate to the speed of the pistons; that such admission is coincident with the closure of the throttle and continuous during the periods in which the locomotive is running with the throttle closed; that the admission of saturated steam, when drifting, and its exclusion, when running with open throttle, are automatically and positively effected, and are independent of the position of the reverse lever; and that the supply of steam through the drifting valve mechanism is positively prevented whenever, and as long as, the locomotive is standing. It will be seen that in the application of the improvement to existing locomotives, the only change required would be the substitution of new distribution valve chest heads, and that no change would be necessary in the design of new locomotives.

We claim as our invention and desire to secure by Letters Patent:

1. In a drifting valve mechanism for locomotives, the combination of a valve controlling the admission of steam to a locomotive cylinder, through a line independent of a throttle governed supply pipe; and means for actuating said valve by positive connections to a moving member of a locomotive, throughout, and in accordance with the speed of, the movement of the locomotive when running with its throttle closed.

2. In a drifting valve mechanism for locomotives, the combination of a valve controlling the admission of steam to a locomotive cylinder, through a line independent of a throttle governed supply pipe; and means for actuating said valve by positive connections to a moving member of a locomotive, throughout the movement of the locomotive when running with its throttle closed.

3. In a drifting valve mechanism for locomotives, the combination of a valve controlling the admission of steam to a locomotive cylinder, through a line independent of a throttle governed supply pipe; and means for effecting the alternate opening and closure of said valve by positive connections to a moving member of the locomotive, throughout the movement of the locomotive when running with its throttle closed.

4. In a drifting valve mechanism for locomotives, the combination of a valve controlling the admission of steam to a locomotive cylinder, through a line independent of a throttle governed supply pipe; means for effecting the alternate opening and closure of said valve by a moving member of the locomotive; and means, automatically operable by and upon the admission and exclusion of steam to and from a throttle governed supply pipe, for cutting off and admitting, respectively, steam from and to said valve.

5. In a drifting valve mechanism for locomotives, the combination of a valve controlling the admission of steam to a locomotive cylinder, through a line independent of a throttle governed supply pipe; intercepting means, interposed between said valve and cylinder, for interrupting direct communication between them; and means for actuating said valve to alternately supply steam to said intercepting means and deliver it therefrom to the cylinder.

6. In a drifting valve mechanism for locomotives, the combination of a valve controlling the admission of steam to a locomotive cylinder, through a line independent of a throttle governor supply pipe; a chamber or casing interposed between said valve and cylinder; and means for actuating said valve to alternately admit steam to said chamber and deliver it therefrom to the cylinder.

7. In a drifting valve mechanism for locomotives, the combination of a drifting valve controlling the admission of steam to a locomotive cylinder, through a line independent of a throttle governed supply pipe; and an automatically operative shut-off valve controlling the admission of steam to the drifting valve, and comprising a casing, connected differential pistons fitted therein, a pipe leading from the steam space of the boiler to the smaller piston, a pipe leading from a throttle controlled supply pipe to the larger piston, and a pipe controlled by the smaller piston and leading therefrom to the drifting valve.

8. In a drifting valve mechanism for locomotives, the combination of a drifting valve chest; a steam supply pipe leading thereto; a steam delivery pipe, leading therefrom; a drifting valve fitted in said chest and controlling, alternately, communication between the steam supply pipe and said chest and between said chest and the steam delivery pipe; and means connecting the drifting valve with a moving member of the locomotive.

9. In a drifting valve mechanism for locomotives, the combination of a drifting valve chest divided into two independent steam chambers, a valve chamber extending through said chest and communicating, by ports, with the steam chambers; a steam supply pipe leading into the valve chamber; a steam delivery pipe leading out of the steam chambers; a drifting valve having two pistons fitted in the valve chamber, each controlling the ports of one of the steam chambers; and means connecting the drifting valve with a moving member of the locomotive.

10. In a drifting valve mechanism for locomotives, the combination of a drifting valve chest adapted for connection to a locomotive distribution valve chest; a steam supply pipe leading into the drifting valve chest; a steam delivery pipe leading therefrom; a drifting valve fitted in the drifting valve chest and controlling, alternately, communication between the steam supply pipe and said chest and between said chest and the steam delivery pipe; and a stem fixed to the drifting valve and adapted for connection to a locomotive distribution valve.

11. In a drifting valve mechanism for locomotives, the combination of a valve controlling the admission of steam to a locomotive cylinder, through a line independent of a throttle governed supply pipe; a drifting delivery steam pipe leading therefrom and adapted for connection to a distribution valve chest steam pipe, adjacent to and in the same direction as the lubricator pipe thereof; and means for actuating the drifting valve by a reciprocating member of a locomotive.

12. In a drifting valve mechanism for locomotives, the combination of a valve controlling the admission of steam to a locomotive cylinder, through a line independent of a throttle governed supply pipe; and means positively connecting said valve to a moving part of the locomotive for actuating said valve in synchronism with the movement of the locomotive piston when the locomotive is running with its throttle closed.

13. In a drifting valve mechanism for locomotives, the combination of a valve controlling the admission of steam to a locomotive cylinder, through a line independent of a throttle governed supply pipe; a member of the locomotive which moves in synchronism with the locomotive piston; and a connection between valve and said moving member joined positively to both whereby steam is passed periodically by the valve in synchronism with the movement of the locomotive piston when the locomotive is running with its throttle closed.

14. In a drifting valve mechanism for locomotives, in combination with the usual throttle governed supply pipe; an intercepting or measuring chamber having steam connection both with the boiler and with the engine cylinder, and means positively driven by a moving part of the locomotive for periodically and successively opening and closing the boiler steam connection and immediately thereafter the cylinder steam connection when the locomotive is running with its throttle closed.

15. In a drifting valve mechanism for locomotives, in combination with the usual throttle governed supply pipe; an intercepting or measuring chamber having steam connection both with the boiler and with the engine cylinder, a valve adapted to alternately interrupt said steam connections, and means operatively connecting the valve to a member of the locomotive and moving in synchronism with the locomotive piston, whereby measured volumes of boiler steam are delivered to the cylinder at each stroke of the piston when the locomotive is running with its throttle closed.

16. In a drifting valve mechanism for steam boilers, in combination with the usual throttle governed supply pipe, an independent supply pipe between boiler and locomotive cylinder, a valve controlling said independent pipe and successively admitting a measured quantity of steam to the line and then to the cylinder and a positive connection between said valve and a part of the locomotive moving in synchronism with the piston for actuating the valve.

In testimony whereof we have hereunto set our hands.

HARRY S. VINCENT.
JOHN L. MOHUN.

Copies of this patent may be obtained for five cents each, by addressing the "Commissioner of Patents, Washington, D. C."